United States Patent
Hadden et al.

(12)

(10) Patent No.: US 9,103,403 B2
(45) Date of Patent: Aug. 11, 2015

(54) THREE PARAMETER, MULTI-AXIS ISOLATORS, ISOLATION SYSTEMS EMPLOYING THE SAME, AND METHODS FOR PRODUCING THE SAME

(75) Inventors: Steven Hadden, Peoria, AZ (US); Dale Thomas Ruebsamen, Glendale, AZ (US); Ryan Goold, Glendale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 714 days.

(21) Appl. No.: 13/093,573

(22) Filed: Apr. 25, 2011

(65) Prior Publication Data

US 2012/0267506 A1    Oct. 25, 2012

(51) Int. Cl.
| F16F 7/00 | (2006.01) |
| F16F 15/06 | (2006.01) |
| B23P 17/04 | (2006.01) |
| F16F 9/36 | (2006.01) |
| F16F 15/02 | (2006.01) |
| F16F 9/32 | (2006.01) |

(52) U.S. Cl.
CPC ............... *F16F 15/06* (2013.01); *F16F 9/3214* (2013.01); *F16F 9/361* (2013.01); *F16F 15/02* (2013.01); *Y10T 29/49826* (2015.01)

(58) Field of Classification Search
CPC ............... F16F 9/103; F16F 9/14; F16F 9/16; F16F 9/18; F16F 9/20; F16F 9/3207; F16F 9/361; F16F 2230/105; F16F 15/00; F16F 15/02; F16F 15/023; F16F 9/19; F16F 9/3214; Y10T 29/49826

USPC ......... 267/136, 140.11, 140.13, 140.3, 140.5, 267/141.1; 248/550, 636
See application file for complete search history.

(56) References Cited

U.S. PATENT DOCUMENTS

| 2,930,455 | A | * | 3/1960 | Williams | ........................ 188/298 |
| 2,939,718 | A | * | 6/1960 | Jackman | ........................ 280/677 |
| 3,247,731 | A | * | 4/1966 | Chapman | ........................ 74/18.1 |
| 3,770,232 | A | * | 11/1973 | Blake | ........................ 267/140.4 |
| 4,351,515 | A | * | 9/1982 | Yoshida | ........................ 267/225 |
| 4,475,440 | A | * | 10/1984 | Rabe et al. | ........................ 91/375 A |
| 4,957,279 | A | | 9/1990 | Thorn | |
| 5,261,266 | A | * | 11/1993 | Lorenz et al. | ........................ 73/1.15 |
| 5,332,070 | A | | 7/1994 | Davis et al. | |
| 5,429,338 | A | * | 7/1995 | Runge et al. | ........................ 248/583 |
| 5,492,312 | A | | 2/1996 | Carlson | |
| 5,690,320 | A | | 11/1997 | Kanda | |
| 5,992,584 | A | | 11/1999 | Moody | |

(Continued)

FOREIGN PATENT DOCUMENTS

EP    0416381 A1 *  3/1991
JP    2008229986 A  * 10/2008

*Primary Examiner* — Melody Burch
(74) *Attorney, Agent, or Firm* — Ingrassia Fisher & Lorenz, P.C.

(57) ABSTRACT

Embodiments of a three parameter, multi-axis isolator configured to limit the transmission of vibrations between a mass and a base are provided. In one embodiment, the three parameter, multi-axis isolator includes an isolator housing configured to be mounted to the base, opposing bellows sealingly mounted within the isolator housing, and a damper piston movably suspended within the isolator housing between the opposing bellows. The damper piston is configured to be coupled to the mass. The opposing bellows deflect with movement of the damper piston along multiple axes to limit the transmission of vibrations between the mass and the base.

19 Claims, 4 Drawing Sheets

(56) References Cited

U.S. PATENT DOCUMENTS

| | | |
|---|---|---|
| 6,378,851 B1 | 4/2002 | McGuire |
| 6,419,213 B2 | 7/2002 | Murai |
| 6,517,060 B1 * | 2/2003 | Kemeny ........................ 267/136 |
| 6,634,472 B1 | 10/2003 | Davis et al. |
| 7,314,213 B2 | 1/2008 | Tanaka |
| 2005/0206054 A1 | 9/2005 | Nishi |
| 2005/0217954 A1 | 10/2005 | Hindle et al. |
| 2008/0289921 A1 | 11/2008 | Mori et al. |
| 2010/0109219 A1 | 5/2010 | Melz et al. |
| 2010/0320358 A1 * | 12/2010 | Boyd et al. .................... 248/636 |

\* cited by examiner

1

THREE PARAMETER, MULTI-AXIS ISOLATORS, ISOLATION SYSTEMS EMPLOYING THE SAME, AND METHODS FOR PRODUCING THE SAME

TECHNICAL FIELD

The present invention relates generally to isolation devices and, more particularly, to embodiments of a three parameter, multi-axis isolator, which may be employed within an isolation system for reducing the transmission of vibrations between a spacecraft and a payload.

BACKGROUND

Satellite and other spacecraft often carry components, such as optical payloads, sensitive to vibratory forces generated by reaction wheels, control moment gyroscopes, or other vibration-emitting devices aboard the spacecraft. Isolation systems are utilized to minimize the transmission of vibratory forces, especially high frequency vibratory forces commonly referred to as "jitter," to such vibration-sensitive components aboard spacecraft. A precision isolation system may combine a certain number of individual isolators (typically three to eight isolators) to provide high fidelity damping in six degrees of freedom. In the case of passive isolation system, viscoelastic isolators (e.g., multi-directional rubber mounts) are often utilized. Viscoelastic isolators are relatively simple, low cost, lightweight devices, which typically provide damping along three orthogonal axes and, thus, in three degrees of freedom. However, the damping characteristics of viscoelastic isolators are non-linear and can vary significantly with changes in amplitude, displacement, and temperature. The damping characteristics of isolation systems incorporating viscoelastic isolators consequently tend to be somewhat limited and difficult to accurately predict.

Viscoelastic isolators are considered two parameter devices, which behave mechanically as a damper and spring in parallel. Advantageously, the peak transmissibility of a two parameter isolator is significantly less than that of an undamped device or a spring in isolation. However, after peak frequency has been surpassed, the damping profile of a two parameter device tends to decrease in gain at an undesirably slow rate. As a result, two parameter devices provide less than ideal attenuation of higher frequency vibrations, such as jitter. To overcome this limitation, three parameter isolators have been developed that further incorporate a second spring element in series with the damper and in parallel with the first spring element. The addition of the second spring in series with the damper allows a more precipitous decrease in gain with increasing frequency after peak frequency has been reached. As a result, three parameter isolators are able to provide superior damping characteristics at higher frequencies while maintaining relatively low peak transmissibilities. Three parameter isolators are thus able to provide superior damping of high frequency vibratory forces. An example of such a three parameter isolator is the D-STRUT® isolator developed and commercially marketed by Honeywell, Inc., currently headquartered in Morristown, N.J.

While providing the above-described advantages, three parameter isolators have traditionally been limited to damping in a single degree of freedom, namely, in an axial direction. At least six three parameter isolators are consequently required to produce a precision isolation system capable of high fidelity isolation in six degrees of freedom ("6-DOF"). By comparison, a 6-DOF isolation system can be produced utilizing as few as three multidirectional viscoelastic mounts combined in, for example, a three point kinematic mounting arrangement. Thus, relative to isolation systems employing multidirectional viscoelastic isolators, isolation systems employing three parameter, axial isolators have a high isolator count and, therefore, tend to be more complex, weighty, bulky, and costly to produce.

It would thus be desirable to provide embodiments of a three parameter isolator that provides damping in multiple degrees of freedom and, specifically, along three substantially orthogonal axes. Ideally, embodiments of such a three parameter, multi-axis isolator would provide a substantially linear damping profile over a relatively wide range in temperature, dynamic environment, and/or loading conditions. It would also be desirable to provide embodiments of an isolation system incorporating a plurality of three parameter, multi-axis isolators to provide, for example, high fidelity isolation in six degrees of freedom. Finally, it would further be desirable to provide embodiments of a method for producing such a three parameter, multi-axis isolator. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a three parameter, multi-axis isolator configured to limit the transmission of vibrations between a mass and a base are provided. In one embodiment, the three parameter, multi-axis isolator includes an isolator housing configured to be mounted to the base, opposing bellows sealingly mounted within the isolator housing, and a damper piston movably suspended within the isolator housing between the opposing bellows. The damper piston is configured to be coupled to the mass. The opposing bellows deflect with movement of the damper piston along multiple axes to limit the transmission of vibrations between the mass and the base.

Embodiments of an isolation system for minimizing the transmission of vibrations between a spacecraft and a spacecraft payload are further provided. In one embodiment, the isolation system includes a plurality of three parameter, multi-axis isolators and mounting hardware. Each of three parameter, multi-axis isolator includes, in turn, an isolator housing, opposing bellows sealingly mounted within the isolator housing, and a damper piston movably suspended within the isolator housing between the opposing bellows and configured to be coupled to the spacecraft payload. The opposing bellows deflect with movement of the damper piston along multiple axes to reduce the transmission of vibratory motion between the isolator housing and the damper piston.

Embodiments of a method for producing a three parameter, multi-axis isolator are still further provided. In one embodiment, the method includes the steps of providing an isolator housing and suspending a damper piston within the isolator housing between opposing bellows such that the damper piston is movable within the isolator housing along three substantially orthogonal axes. The damper piston cooperates with the opposing bellows and the isolator housing to at least partially define a plurality of hydraulic chambers within the isolator housing.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
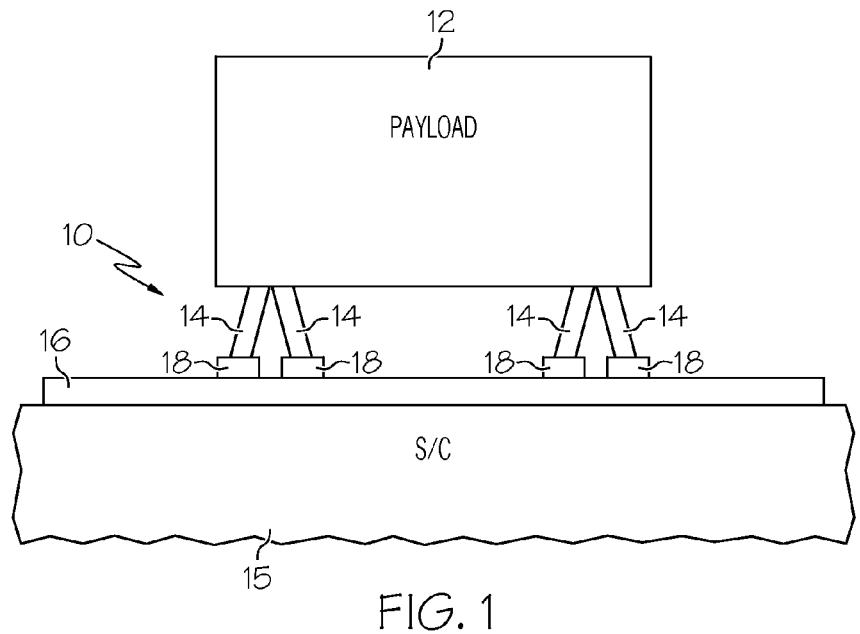
FIGS. 1 and 2 are simplified schematic and isometric views, respectively, of an isolation system employing four three parameter, multi-axis isolators to provide high fidelity isolation in six degrees of freedom in accordance with an exemplary embodiment of the present invention.

FIG. 1 is simplified schematic of an isolation system 10 illustrated in accordance with an exemplary embodiment of the present invention and well-suited for reducing the transmission of vibrations between a payload 12 and a host spacecraft 15. In the illustrated example, isolation system 10 includes four isolators 14, which are mechanically coupled to and collectively support payload 12. The opposing ends of isolators 14 are mounted to a spacecraft mounting interface 16 utilizing mounting brackets 18. As will be described more fully below, isolators 14 each provide damping in three degrees of freedom and, specifically, along three substantially orthogonal axes. As a result, four isolators 14 can be combined in an over-constrained, four point kinematic mounting arrangement (shown in FIG. 1) or three isolators 14 can be combined in a standard, three point kinematic mounting arrangement to yield a high fidelity isolation system capable of providing damping in six degrees of freedom ("6-DOF") in a readily predictable manner. By comparison, in the case of single-axis or axial isolators, six or more isolators are typically required to produce such high fidelity, six-DOF isolation system. As will further be described below, multi-axis isolators 14 are three parameter devices, which provide superior vibration attenuation characteristics as compared to conventional multi-direction rubber mounts and other two parameter isolation devices.

Figure 2:
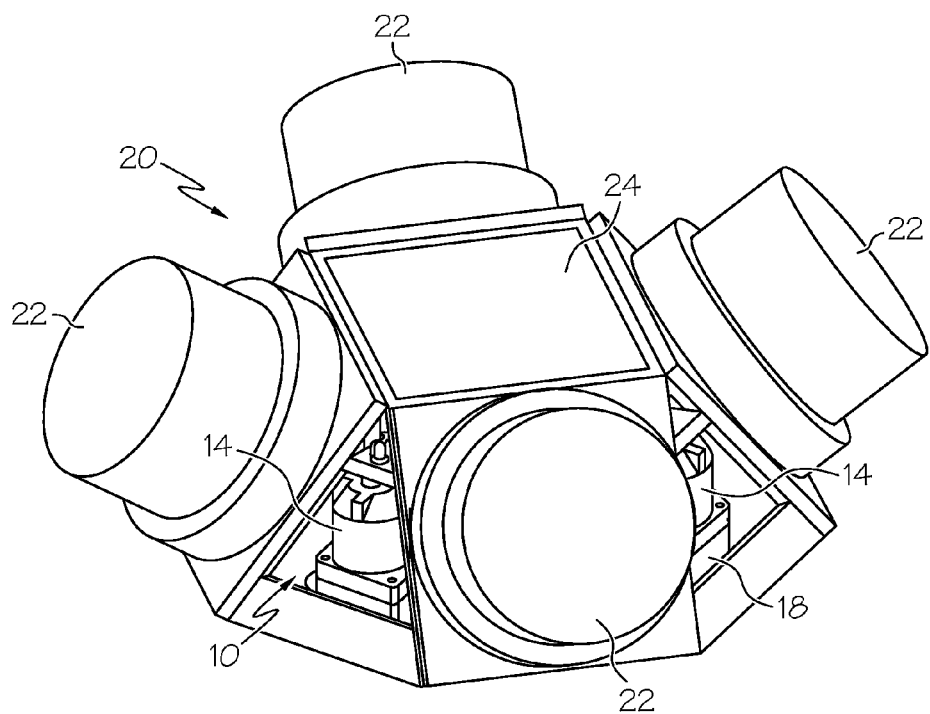

In certain embodiments, payload 12 may assume the form of a vibration-sensitive component, such as an optical payload or sensor suite, and isolation system 10 may serve to minimize the transmission of vibrations from a vibration-emitting source aboard spacecraft 15, through spacecraft mounting interface 16, and to payload 12. In other embodiments, payload 12 may include one or more vibration-emitting devices, and isolation system 10 may serve to reduce the transmission of vibrations from payload 12 to spacecraft 15 and any vibration-sensitive components deployed thereon. In this latter regard, payload 12 may include one or more rotational devices utilized in the attitude adjustment of spacecraft 15, such as one or more reaction wheels or control moment gyroscopes. As one specific example, and as illustrated in FIG. 2, payload 12 may assume the form of a reaction wheel array 20 including a number of reaction wheels 22 mounted to and circumferentially spaced about a support platform 24, which is, in turn, supported by isolators 14 (only two of which can be seen in FIG. 2).

Figure 3:
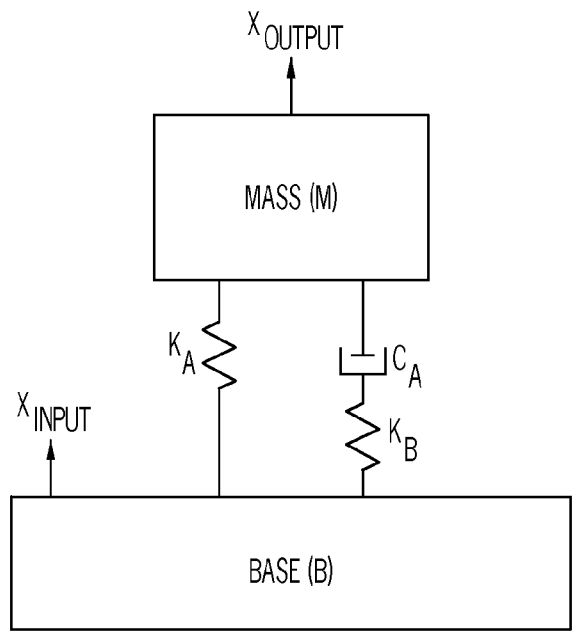
FIG. 3 is a schematic illustrating an exemplary three parameter vibration isolator.

As previously stated, isolators 14 are three parameter devices. As schematically illustrated in FIG. 3, a three parameter device includes the following mechanical elements: (i) a first spring member $K_A$, which is coupled between a mass M (e.g., payload 12 shown in FIG. 1) and a base B (e.g., satellite mounting interface 16 shown in FIG. 1); (ii) a second spring member $K_B$, which is coupled between damped mass M and base B in parallel with first spring member $K_A$; and (iii) a damper $C_A$, which is coupled between damped mass M and base B in parallel with the first spring member $K_A$ and in series with the second spring member $K_B$. Such a three parameter device can be tuned to provide superior damping characteristics (i.e., a lower overall transmissibility) as compared to undamped devices and two parameter devices over a given frequency range. Transmissibility may be expressed by the following equation:

$$T(\omega) = \frac{X_{output}(\omega)}{X_{input}(\omega)} \qquad \text{EQ. 1}$$

wherein $T(\omega)$ is transmissibility, $X_{output}(\omega)$ is the payload output motion, and $X_{input}(\omega)$ is the base input motion.

Figure 4:
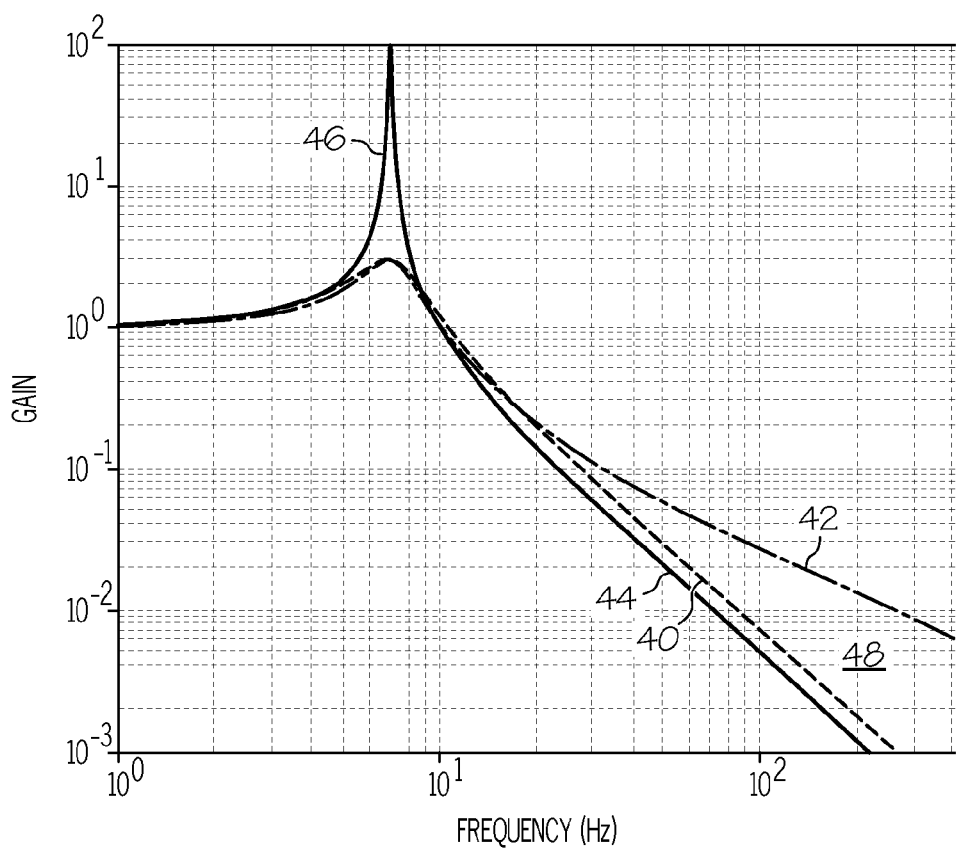
FIG. 4 is a transmissibility plot of frequency (horizontal axis) versus gain (vertical axis) illustrating the exemplary transmissibility profile of a three parameter isolator as compared to the transmissibility profiles of a two parameter isolator and an undamped device.

FIG. 4 is a transmissibility plot illustrating the damping characteristics of three parameter isolator (curve 40) as compared to a two parameter isolator (curve 42) and an undamped device (curve 44). As indicated in FIG. 4 at 46, the undamped device (curve 44) provides a relatively high peak gain at a threshold frequency, which, in the illustrated example, is moderately less than 10 hertz. By comparison, the two parameter device (curve 42) provides a significantly lower peak gain at the threshold frequency, but an undesirably gradual decrease in gain with increasing frequency after the threshold frequency has been surpassed (referred to as "roll-off"). In the illustrated example, the roll-off of the two parameter device (curve 42) is approximately 20 decibel per decade ("dB/decade"). Lastly, the three parameter device (curve 40) provides a low peak gain substantially equivalent to that achieved by the two parameter device (curve 42) and further provides a relatively steep roll-off of about 40 dB/decade. The three parameter device (curve 40) thus provides a significantly lower transmissibility at higher frequencies, as quantified in FIG. 4 by the area 48 bounded by curves 40 and 42. By way of non-limiting example, further discussion of three parameter isolators can be found in U.S. Pat. No. 5,332,070, entitled "THREE PARAMETER VISCOUS DAMPER AND ISOLATOR," issued Jan. 26, 1994; and U.S. Pat. No. 7, 182,188 B2, entitled "ISOLATOR USING EXTERNALLY PRESSURIZED SEALING BELLOWS," issued Feb. 27, 2007; both of which are assigned to assignee of the instant application.

Figure 5:
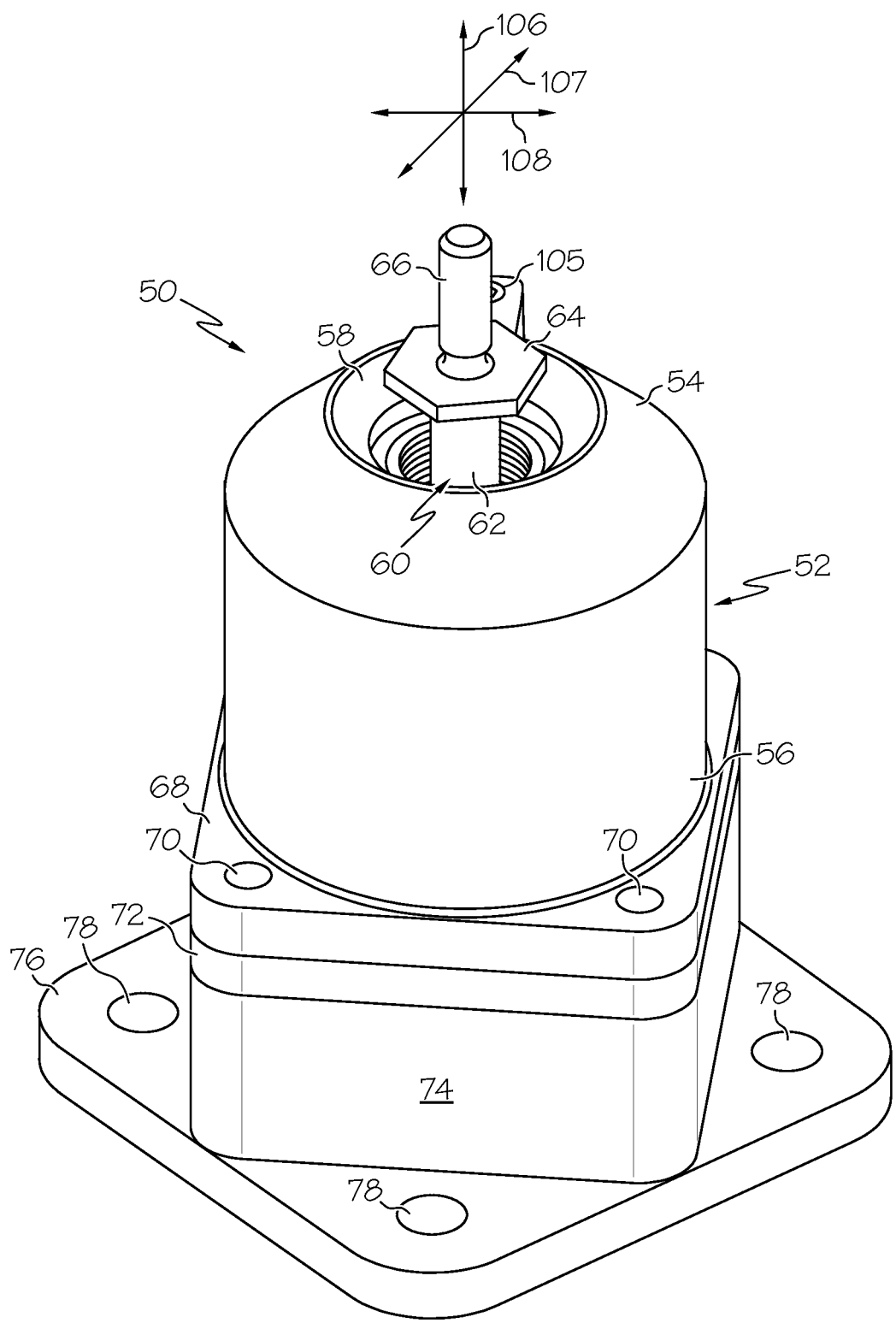
FIGS. 5 and 6 are isometric and cross-sectional views, respectively, of a three parameter, multi-axis isolator illustrated in accordance with an exemplary embodiment of the present invention.

FIG. 5 is an isometric view of an exemplary embodiment of a multi-axis, three parameter isolator 50 suitable for usage as one or all of isolators 14 shown in FIGS. 1 and 2. Exemplary isolator 50 includes a generally cylindrical isolator housing 52 having a base portion 54 and an opposing end portion 56. A connecting rod 60 extends through a central opening 58 provided in end portion 56. Connecting rod 60 has a first end, which is hidden from view in FIG. 5 and which is mounted to a damper piston within isolator housing 52 (described more fully below), and a second end 62, which extends in an axial direction away from isolator housing 52. To provide a convenient frame of reference, the first and second ends of connecting rod 60 will be referred to herein as "inner and outer ends," respectively, in view of their relative proximity to the host spacecraft in one possible mounting arrangement; it will be appreciated, however, that isolator 50 may assume any orientation in three dimensional space and that isolator 50 may be deployed such that end 62 of connecting rod 60 is mounted to the spacecraft while housing 52 is mounted to the spacecraft payload.

When isolator 50 is installed onboard a spacecraft, outer end 62 of connecting rod 60 is mechanically connected to a spacecraft payload, such as payload 12 shown in FIGS. 1 and 2. Connecting rod 60 may be directly affixed to the payload or, instead, attached to a support structure (e.g., a pallet or frame) to which the payload is mounted. To facilitate attachment to a payload, outer end 62 of connecting rod 60 may be fabricated to include one or more coupling features. For example, as shown in FIG. 5, outer end 62 of connecting rod 60 may be fabricated to include a mounting collar 64 and a threaded bolt portion 66. Opposite projecting rod end 62, base portion 54 of isolator housing 52 is mounted to the host spacecraft. The manner in which isolator housing 52 is mounted to the spacecraft will vary amongst embodiments. In the illustrated example, base portion 54 is fabricated to include a mounting flange 68 having a plurality of fastener openings 70 therethrough; and a plurality of bolts or other fasteners (not shown) is utilized to join mounting flange 68 to a spacer plate 72 and a corresponding mounting bracket 74. Mounting bracket 74 may, in turn, include a flange portion 76 having a plurality of fastener openings 78 therein for attachment to a corresponding interface provided on the spacecraft body or frame utilizing an additional set of fasteners.

Figure 6:
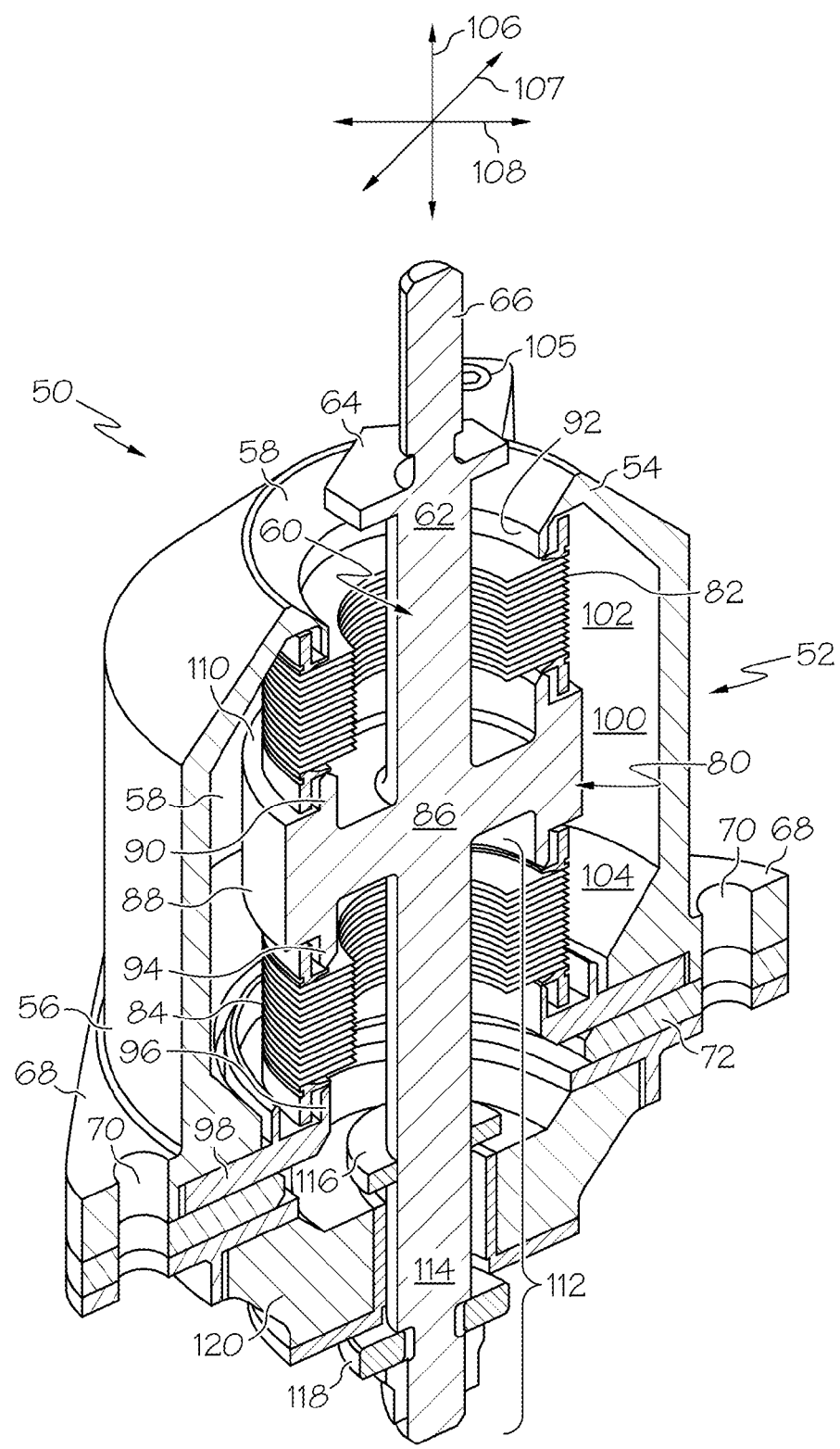

FIG. 6 is a cross-sectional view of the multi-axis, three parameter isolator 50 illustrated in FIG. 5. As can be seen in FIG. 6, a damper piston 80, a first bellows 82, and a second bellows 84 are each disposed within an inner cavity provided in isolator housing 52. Damper piston 80 assumes the form of a disc-shaped body having a central portion 86 circumscribed or surrounded by an outer rim portion 88. Central portion 86 of damper piston 80 is fixedly coupled to the inner terminal end of connecting rod 60; e.g., in one implementation, damper piston 80 and connecting rod 60 are integrally formed as a single machined piece. Damper piston 80 thus moves in conjunction with connecting rod 60 during operation of isolator 50. Bellows 82 and 84 are sealingly coupled to opposing faces of damper piston 80 thereby effectively suspending damper piston 80 within isolator housing 52. When damper piston 80 resides in the normal or design position shown in FIGS. 5 and 6, a first annular clearance is provided around the outer circumference of damper piston 80 and the interior of isolator housing 52, and a second annular clearance is provided between connecting rod 62 and the inner circumferential edge of isolator housing 52 defining central opening 58. These clearances, in combination with the dual bellows suspension mount, enable damper piston 80 and, therefore, connecting rod 60 to move along three substantially orthogonal axes. In particular, damper piston 80 and connecting rod 60 can slide axially with respect to isolator housing 52 (indicated in FIGS. 5 and 6 by arrow 106). In addition, damper piston 80 and connecting rod 60 can move laterally with respect to isolator housing 52 along two substantially perpendicular axes, which are substantially orthogonal with the longitudinal axis of isolator 50 (as indicated in FIGS. 5 and 6 by arrows 107 and 108). It will be noted that rotation of damper piston 80 and connecting rod 60 about the longitudinal axis of isolator 50 is generally prevented when isolator 50 is employed within a three or four point mount, as described above in conjunction with FIGS. 1 and 2.

The manner in which damper piston 80 is sealingly coupled to opposing bellows 82 and 84 may vary amongst embodiments; however, in the illustrated example, the outer end of bellows 82 is sealingly joined to an inner annular collar provided around central opening 58 in end portion 54 of isolator housing 50, and the inner end of bellows 82 is sealingly joined to an annular lip 90 provided around the outer radial face of damper piston 80. Similarly, the outer end of bellows 84 is sealingly joined to an annular lip 94 provided around the inner radial face of damper piston 80, and the inner end of bellows 84 is sealingly joined to an annular lip 96 provided around the interior of a base end cap 98 captured between base portion 56 of isolator housing 52 and spacer plate 72 when isolator 50 is fully assembled. In embodiments wherein bellows 82 and 84 are fabricated from a metal or alloy, bellows 82 and 84 may be sealingly adjoined to the above-listed components by bonding or welding; however, any coupling technique may be utilized suitable for forming a fluid-tight or hermetic seal between each bellows and its mating components.

Depending upon the particular design of isolator 50, bellows 82 and 84 can be either internally or externally pressurized. In the illustrated exemplary embodiment, bellows 82 and 84 are externally pressurized; that is, damping fluid acts on the external surfaces of bellows 82 and 84. When isolator 50 is fully assembled, bellows 82 and 84 cooperate with annular rim portion 88 of damper piston 80, base end cap 98, and the interior surfaces of isolator housing 52 to define two hermitically-sealed hydraulic chambers 102 and 104 within isolator housing 52. Chambers 102 and 104 are fluidly coupled by an intermediate annulus 100, which is bounded along its inner circumference by annular rim portion 88 of damper piston 80 and bounded along its outer circumference by the annular sidewall of isolator housing 52. When damper piston 80 is the normal or design position shown in FIGS. 5 and 6, chambers 102 and 104 reside on opposing sides of a plane extending through damper piston 80 in a direction substantially perpendicular to the longitudinal axis of isolator 50. Prior to operation of isolator 50, hydraulic chambers 102 and 104 are filled with a damping fluid (not shown), such as a silicone-based liquid. A fill port 105 may be provided through isolator housing 52 to enable hydraulic chambers 102 and 104 to be filled with a selected damping fluid after assembly of isolator 50. If desired, an O-ring or other seal (not shown) may be disposed between base end cap 98 and an inner wall of housing 52 to reduce the likelihood of leakage of the damping fluid from hydraulic chambers 102 and 104.

With continued reference to FIG. 6, annular rim portion 88 of damper piston 80 projects radially beyond opposing bellows 82 and 84 into an area between hydraulic chambers 102 and 104. Both radial (lateral) and axial surface area of annular rim portion 88 is thus exposed to the damping fluid within chamber 102, chamber 104, and intermediate annulus 100. As utilized herein, the term "effective radial surface area" and the term "effective lateral surface area" are each utilized to denote the surface area of damper piston 80 in contact with and acting directly on the damping fluid when piston 80 is moved in a lateral directions (i.e., along axes 107 or 108 in FIGS. 5 and 6). Conversely, the term "effective axial surface area" is utilized to denote the surface area of damper piston 80 in contact with and acting directly on the damping fluid when piston 80 is moved in an axial direction (i.e., along axis 106 in FIGS. 5 and 6). In the illustrated exemplary embodiment, the effective radial (lateral) surface area of damper piston 80 is equivalent to the circumferential surface area of annular rim portion 88, which is a product of the outer diameter of damper piston 80 multiplied by the axial height of annular rim portion 88. The effective axial surface area of damper piston 80 is equivalent to the areas of the opposing radial faces of rim portion 88 exposed to the damping fluid within chambers 102 and 104 (identified in FIG. 6 at 110), as determined by the difference between the outer diameters of bellows 82 and 84 and the outer diameter of outer annular rim portion 88.

In preferred embodiments, the effective radial (lateral) surface area of piston 80 is substantially equivalent to the effective axial surface area of piston 80, the phrase "substantially equivalent" denoting a disparity less than about 10%. In addition, bellows 82 and 84 are each preferably sized or otherwise designed to have substantially equivalent radial (lateral) and axial stiffnesses. In this manner, movement of damper piston 80 along any given axis 106-108 will displace a substantially equivalent volume of damping fluid. The accumulation of pressure within hydraulic chambers 102 and 104 will likewise be substantially equivalent, and a substantially uniform deflection or ballooning of bellows 82 and 84 will occur. As a result, isolator 50 will provide a substantially linear damping profile independently of the particular direction in which damper piston 80, connecting rod 60, and the payload coupled to rod 60 move. Furthermore, the damping profile of isolator 50 will remain substantially constant through variations in load, dynamic environment, and deflection characteristic of the operational environment of isolator 50. Advantageously, the damping properties of isolator 50 in axial and radial directions can be independently tuned depending upon desired application by, for example, altering fluid viscosity and the difference between the outer diameter of damper piston 80 relative to bellows 82 and 84. In addition, bellows stiffness is independent of damping and can be individually tuned depending upon the desired performance characteristics of isolator 50.

Although isolator 50 provides substantially linear, predictable damping properties in both axial and radial directions, the damping profile of isolator 50 in an axial direction will typically vary relative to damping profile of isolator 50 in a lateral direction due to differences in fluid mechanics. When damping piston 80 moves in an axial direction, damping is primarily provided by viscous losses as the damping fluid flows from one hydraulic chamber, through intermediate annulus 100, and into the other hydraulic chamber. By comparison, when damping piston 80 is moved laterally, damping is provided predominately by a squeeze film effect as outer rim portion 88 moves toward the inner sidewall of housing 52, and the damping fluid sheers against housing 52 to accommodate the lateral movement of piston 80.

During spacecraft launch, exceptionally high loads can be transmitted to damper piston 80, which can result in an exceedingly large stroke of piston 80, an undesirably high accumulation of pressure within hydraulic chambers 102 and 104, and the potential leakage of damping fluid from isolator 50. It is thus desirable to prevent piston over-travel when isolator 50 is subjected to high loading conditions during spacecraft launch. One manner in which piston over-travel can be prevented is through the use of launch locks; i.e., rigid structures positioned between the spacecraft body and the payload supported by isolator 50, which limit the stroke of damper piston 80 during spacecraft launch and which are removed after launch to enable operation of isolator 50. Alternatively, isolator 50 can be designed to operate in a secondary, high load damping mode wherein the force transmission path is effectively shunted away from bellows 82 and 84 and redirected through at least one relatively stiff isolation member in high loading conditions, as described more fully below.

In the exemplary embodiment illustrated in FIG. 6, isolator 50 further includes a secondary, high load damping system 112, which includes high stiffness snubber member 120. In this example, snubber member 120 assumes the form of an annular rubber piece having a relatively stiff inner insert or rate plate, which is secured against base portion 56 of isolator housing 52. However, in alternative embodiments, the particular form and location of high stiffness element 120 can vary; e.g., in certain embodiments, snubber member 120 may be mounted within isolator housing 52 and possibly nested within bellows 82 or bellows 84 An axial extension 114 is affixed to (e.g., integrally formed with) central portion 86 of damper piston 80 and extends axially from piston 80, through bellows 84, and through an opening provided in base portion 56 of isolator housing 52. First and second bumpstop collars 116 and 118 are provided around the terminal end portion of extension 114. When the axial displacement of damper piston 80 is sufficiently large in high loading conditions, bumpstop collar 116 or collar 118 will engage snubber member 120 and the load path will be shunted through element 120 to prevent undesirably large deflections of bellows 82 and 84 and to maintain the pressure within hydraulic chambers 102 and 104 within acceptable levels. Similarly, when damper piston 80 is sufficiently displaced in a lateral direction, the outer circumferential surface of bumpstop collar 116 will engage an inner circumferential area or slanted sidewall 122 of snubber member 120, and the load path will once again shunt through element 120. Thus, in the illustrated example, isolator 50 functions as a two stage or dual mode device, which operates in a primary or soft damping mode under low to moderate loading conditions and in a secondary or stiff damping under high loading conditions. This example notwithstanding, the inclusion of a secondary damping system is by no means necessary, and isolator 50 may operate exclusively in a single damping mode in alternative embodiments.

The three parameter, multi-axis isolator 50, as shown in FIGS. 5 and 6, is presented by way of example only, and the particular construction, design, and assembly of isolator 50 will inevitably vary amongst different embodiments. It is noted, however, that assembly of the exemplary multi-axis isolator 50 shown in FIGS. 5 and 6 is relatively straightforward. During assembly, damper piston 80, connecting rod 60, and opposing bellows 82 and 84 may first be installed within the cavity of isolator housing 52 through open base end 56 to suspend damper piston 80 within housing 52. Base end cap 98 may then be positioned over base end 56 to enclose hydraulic chambers 102 and 104. Base end cap 98 is conveniently secured in place by attachment of spacer plate 72 and mounting bracket 74 (FIG. 5) to base flange 68. Prior to or after installation over base end 56, inner annular lip 96 of base end cap 98 is sealingly attached to bellows 84 by, for example, welding or bonding. Finally, hydraulic chambers 102 and 104 may be filled with a selected damping fluid through fill port 105 prior to installation of isolator 50 onboard a spacecraft.

The foregoing has thus provided an exemplary embodiment of a three parameter isolator that provides damping along three substantially orthogonal axes. Advantageously, the above-described three parameter, multi-axis isolator provided a substantially linear damping profile over a relatively wide range of variations in temperature, dynamic environment, and/or loading conditions. The foregoing has also provided embodiments of an isolation system incorporating a plurality of three parameter, multi-axis isolators to provide a high fidelity isolation in six degrees of freedom. Due to the ability of the above-described isolators to provide damping along multiple axes, a 6-DOF isolation mount can be produced utilizing three to four individual isolators to reduce part count, cost, complexity, weight, and envelope as compared to a conventionally-designed 6-DOF isolation system employing axial isolators.

While the above-described exemplary embodiment included externally-pressurized bellows, this need not always be the case. In further embodiments, the bellows may be internally pressurized and one or more flow orifices may be provided through the damper piston to enable fluid flow between the hydraulic chambers during displacement of the damper piston. Internal pressurization of the bellows may allow the overall dimensions of the isolator to be more compact. However, relative to internally-pressurized bellows, externally-pressurized bellows tend to be more resistant to buckling and thus enable embodiments of the isolator to provide improved performance in higher loading conditions.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A three parameter, multi-axis isolator for deployment between a mass and a base, the three parameter, multi-axis isolator comprising:
   an isolator housing mountable to the base;
   opposing bellows sealingly disposed within the isolator housing;
   opposing hydraulic chambers defined, at least in part, by the opposing bellows and configured to be filled with a damping fluid; and
   a damper piston movably suspended within the isolator housing between the opposing bellows and configured to be coupled to the mass, the opposing bellows deflecting with movement of the damper piston along multiple axes to reduce the transmission of vibrations between the mass and the base;
   wherein, when the opposing hydraulic chambers are filled with the damping fluid, the damping piston displaces a damping fluid volume when moving in an axial direction by a first amount that is substantially equivalent to the damping fluid volume displaced by the damper piston when moving in a lateral direction by the first amount.

2. A three parameter, multi-axis isolator according to claim 1 wherein the damper piston is movable along three substantially orthogonal axes.

3. A three parameter, multi-axis isolator according to claim 1 wherein the opposing bellows comprise:
   a first bellows having substantially equivalent axial and lateral stiffnesses; and
   a second bellows having substantially equivalent axial and lateral stiffnesses.

4. A three parameter, multi-axis isolator according to claim 1 wherein the opposing bellows are sealingly coupled to opposing radial faces of the damper piston.

5. A three parameter, multi-axis isolator according to claim 1 wherein the damper piston has an effective lateral surface area and an effective axial surface area, and wherein the effective lateral surface area of the damper piston is substantially equivalent to effective axial surface area of the damper piston.

6. A three parameter, multi-axis isolator according to claim 1 wherein the damper piston extends radially into an area between the opposing hydraulic chambers.

7. A three parameter, multi-axis isolator according to claim 1 wherein the damper piston comprises:
   a central portion; and
   an annular rim portion extending radially from the central portion into an area between the opposing hydraulic chambers.

8. A three parameter, multi-axis isolator according to claim 7 further comprising an annulus fluidly coupling the opposing hydraulic chambers, the annulus bounded circumferentially by the annular rim portion of the damper piston and an inner surface of the isolator housing.

9. A three parameter, multi-axis isolator according to claim 1 further comprising a connecting rod having a first end portion fixedly coupled to the damper piston and having a second end portion configured to be coupled to the mass.

10. A three parameter, multi-axis isolator according to claim 9 wherein the connecting rod extends through one of the opposing bellows and through a central opening provided in the isolator housing.

11. A three parameter, multi-axis isolator according to claim 10 wherein an annular clearance is provided between the connecting rod and the portion of the isolator housing defining the central opening to permit the connecting rod to move laterally in conjunction with the damper piston.

12. A three parameter, multi-axis isolator according to claim 1 further comprising a secondary damping system coupled to the isolator housing.

13. A three parameter, multi-axis isolator according to claim 12 wherein the secondary damping system comprises:
   a snubber member; and
   an axial extension having a first end portion fixedly coupled to the damper piston and having a second end portion engaging the snubber member when the damper piston is sufficiently displaced in at least one of an axial direction and a lateral direction.

14. An isolation system for minimizing the transmission of vibrations between a spacecraft and a spacecraft payload, the isolation system comprising:
   a plurality of three parameter, multi-axis isolators, each comprising:
   an isolator housing;
   opposing bellows sealingly mounted within the isolator housing;
   opposing hydraulic chambers defined, at least in part, by the opposing bellows and configured to be filled with a damping fluid; and
   a damper piston movably suspended within the isolator housing between the opposing bellows and configured to be coupled to the spacecraft payload, the opposing bellows deflecting with movement of the damper piston along multiple axes to reduce the transmission of vibratory motion between the isolator housing and the damper piston; and
   mounting hardware coupled to the isolator housing and configured to mount the plurality of three parameter, multi-axis isolators to the spacecraft;
   wherein, when the opposing hydraulic chambers are filled with the damping fluid, the damping piston displaces a damping fluid volume when moving in an axial direction by a first amount that is substantially equivalent to the damping fluid volume displaced by the damper piston when moving in a lateral direction by the first amount.

15. An isolation system according to claim 14 wherein the plurality of three parameter, multi-axis isolators each comprise a connecting rod extending from the damper piston, through one of the opposing bellows, and through the isolator housing to couple the damper piston to the spacecraft payload.

16. An isolation system according to claim 14 wherein the opposing bellows comprise:
   a first bellows having substantially equivalent axial and lateral stiffnesses; and
   a second bellows having substantially equivalent axial and lateral stiffnesses.

17. An isolation system according to claim 14 wherein the plurality of three parameter, multi-axis isolators consists of more than two and less than five three parameter, multi-axis isolators positioned so as to limit the transmission of vibrations between the spacecraft payload and the spacecraft in six degrees of freedom.

18. A three parameter, multi-axis isolator for deployment between a mass and a base, the three parameter, multi-axis isolator comprising:
   an isolator housing mountable to the base;
   opposing bellows sealingly disposed within the isolator housing, each of the opposing bellows having an axial stiffness and a lateral stiffness that are substantially equivalent;
   opposing hydraulic chambers defined, at least in part, by the opposing bellows and configured to be filled with a damping fluid; and
   a damper piston movably suspended within the isolator housing between the opposing bellows and configured to be coupled to the mass, the opposing bellows deflecting with movement of the damper piston along three substantially orthogonal axes to reduce the transmission of vibrations between the mass and the base;
   wherein the damper piston has an effective lateral surface area and an effective axial surface area, and wherein the effective lateral surface area of the damper piston is substantially equivalent to effective axial surface area of the damper piston.

19. A three parameter, multi-axis isolator according to claim 18 further comprising:
   a connecting rod having a first end portion fixedly coupled to the damper piston and having a second end portion projecting from the isolator housing; and
   one or more annular clearances provided between the connecting rod and the isolator housing enabling the connecting rod to move in conjunction with the damper piston along the three substantially orthogonal axes.

* * * * *